Dec. 17, 1957  H. J. LANDRY  2,816,295
FOLDING PLAY-YARD
Filed Oct. 22, 1954  2 Sheets-Sheet 1

INVENTOR
HENRY J. LANDRY
by Charles R. Fay,
ATTORNEY

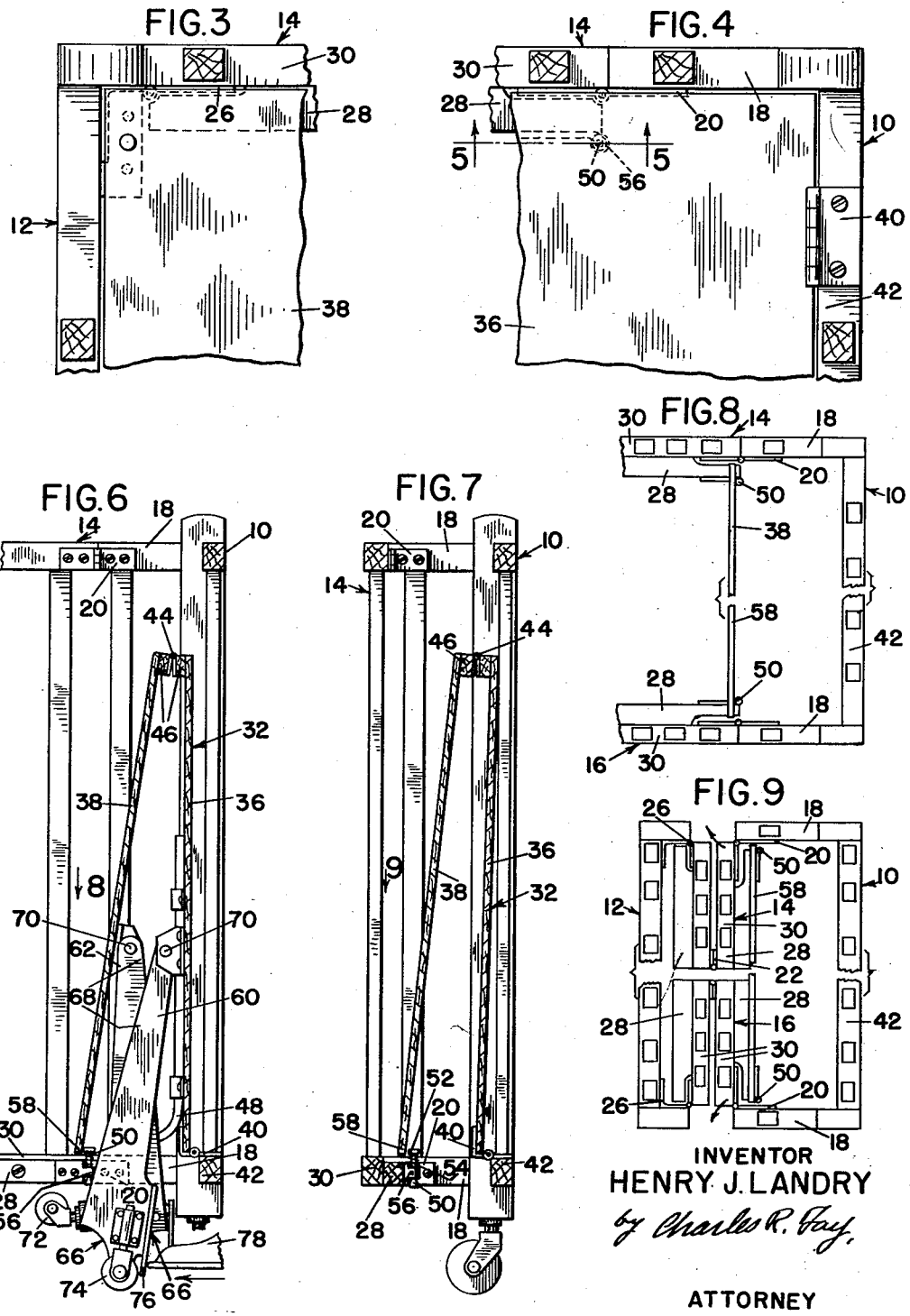

United States Patent Office 2,816,295
Patented Dec. 17, 1957

2,816,295

FOLDING PLAY-YARD

Henry J. Landry, Ashburnham, Mass.

Application October 22, 1954, Serial No. 463,928

13 Claims. (Cl. 5—99)

This invention relates to a new and improved folding play-yard, and the principal object of the invention resides in the provision of a play-yard having a folding floor comprising a pair of articulated floor members, one only of which is hinged to a wall of the play-yard, so that the articulated floor may be folded wholly against the wall, with inswinging side walls connecting the said wall to an opposite wall, the inswinging side walls and the opposite wall being foldable to overlie the articulated floor disposed against the first-named side wall in folded condition, and including novel supporting members for strengthening the floor and maintaining the same horizontal when extended to form the play-yard, said supporting means including a pair of inter-pivoted links which are free of said floor members except at their opposite ends and underlie the floor members and support the same in the manner of a truss when the floor members are extended.

Other objects of the invention include the provision of a folding play-yard as above described including a pedal for folding the play-yard, a kick plate for quickly and easily extending the floor to horizontal operative condition, said kick plate being associated with one of said floor-supportnig links; the provision of a new and improved supporting caster construction and a new and improved floor rigidifying and supporting means.

Still further objects of the invention include the provision of means automatically starting the floor from folded to extended condition upon operation of the swinging side walls from folded toward extended condition, said means comprising pins providing stops for a part of the floor, preventing folding of the same to a fully-folded condition, so that the floor parts are always ready for quick and easy extension to operative condition, said pins being located on extensions of the swinging side walls and having a swinging motion therewith for engaging the free edge of an articulated floor part for the purpose described.

Other objects and advantages of the invention will appear hereinafter.

Reference is to be had to the accompanying drawings, in which:

Figs. 3 and 4 are enlarged sections on the corresponding lines in Fig. 1;

Figure 1:
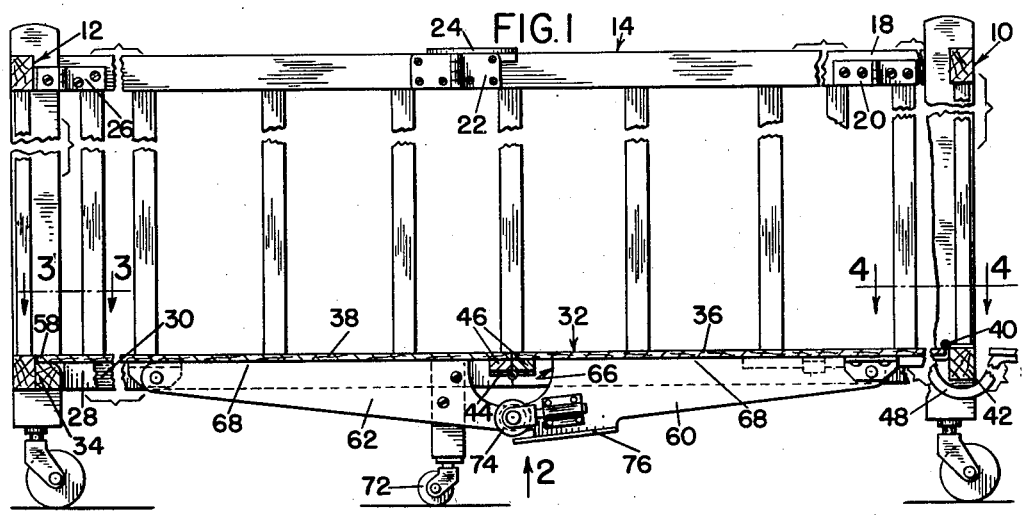
Fig. 1 is a view in side elevation of a play-yard according to the present invention and showing the same in extended condition ready for use, parts being broken away and parts being in section.

Figs. 6 and 7 are sectional views illustrating the construction and operation of the floor starting means, parts being omitted from Fig. 7 for clarity and illustration; and Figs. 8 and 9 are diagrammatic views, with parts omitted for clarity of illustration, looking in the directions of the respective arrows in Figs. 6 and 7.

In carrying out the present invention, there is provided a play-yard having a rigid front wall generally indicated at 10, a rigid rear wall generally indicated at 12, and interconnecting inswinging side walls 14 and 16. The wall 10 is provided with rigid lateral extensions 18 to which are secured hinges 20 for hinging the side walls 14 and 16, the latter being provided with hinges 22 and latch means 24. The latch means may be of any conventional type to hold the respective parts of the individual side wall extended as in Fig. 1.

The side walls 14 and 16 are hinged as at 26 to the corner posts of the wall 12, and the side walls carry at their lower margins supporting runs 28 which are secured thereto and have upper surfaces at a lower level than the upper edges of the corresponding rails 30 of the inswinging side walls, so that the floor which is generally indicated at 32 may rest on the top edges of the runs 28 and still remain on an even level with rails 30. The rear wall 12 is provided with a cleat 34 that supports the floor 32 at its free end as seen in Fig. 1.

Figure 2:
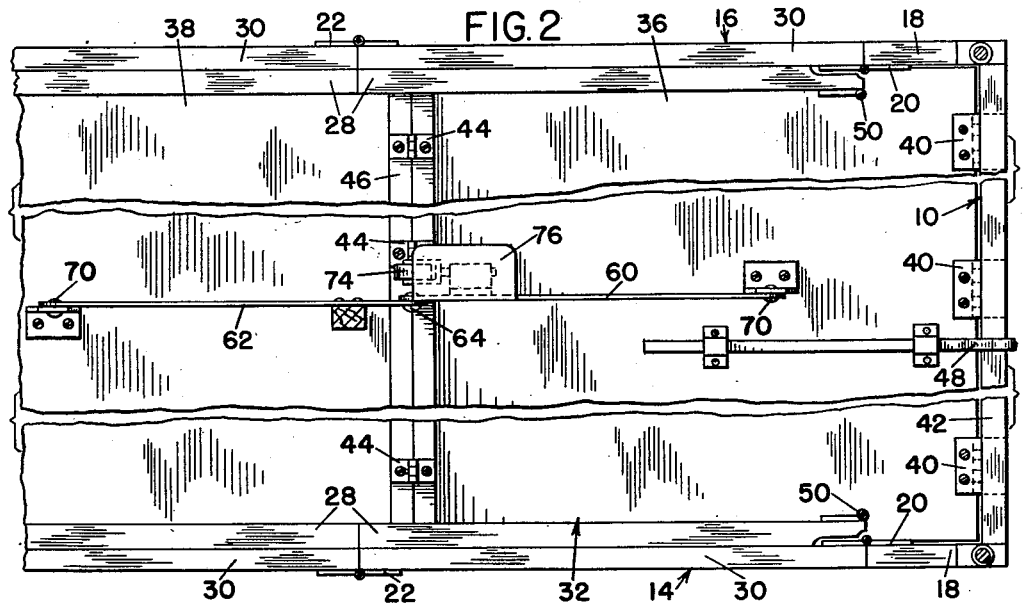
Fig. 2 is a bottom plan view of the play-yard of Fig. 1.

The floor is composed of two articulated parts 36 and 38. Part 36 is hinged as at 40 to the bottom rail 42 of front wall 10. The two floor parts 36 and 38 are hinged together at 44 and in the preferred embodiment of the invention hinges 44 are mounted on two strips 46 secured respectively at the rear edges of the floor parts 36 and 38 and extend substantially the length thereof, see Fig. 2, providing a special rigidifying and supporting means for the floor parts at the center of the play-yard in extended condition thereof.

A pedal 48 is secured to the floor part 36 and extends outwardly beyond wall 10, so that when this pedal is depressed, the floor parts 36 and 38 tend to rise into the folded positioning of Fig. 6. This action is ordinarily aided manually from the time that the hinge 44 has risen into easy manual reach of the operator.

Adjacent the front wall 10, each run 28 is provided with a pin 50 having a head 52 and a spring 54 normally maintaining the pin in raised position, see Figs. 6 and 7, by bearing on a supporting ferrule or the like 56. It will be seen from Figs. 4, 8 and 9 that pins 50 have an angular motion with the side walls as the latter swing in and out.

As shown in Fig. 6, the pin 50 has stopped the folding motion of the floor part 38. When the inswinging side walls 14 and 16 are swung inwardly over the folded floor, the pins 50 retreat to the Fig. 7 and Fig. 9 positions, allowing floor part 38 to retreat a little farther. The pins act as stops, however, and hold floor part 38 slightly extended in fully folded condition.

When the swinging side walls 14 and 16 are moved outwardly from the Fig. 9 position to that of Fig. 8, pins 50 move in an arc and move the lower, free end of floor part 38 to the position of Fig. 6. This action initiates the extension motion of the floor parts, so that the floor will automatically become extended. However, if the floor should not of itself move to the left in Fig. 6, still the floor has been extended as described sufficiently so that a very slight manual action on the part of the operator is all that is required to fully extend the floor to the Fig. 1 position.

Figure 5:
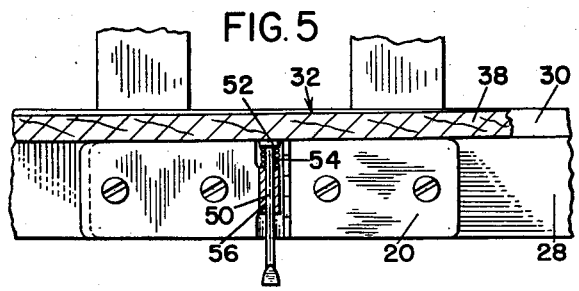
Fig. 5 is an enlarged section on line 5—5 of Fig. 4.

When the floor is extended to the Fig. 1 position, the pins 50 will be depressed against the action of the springs 54 within the ferrules 56 (see Fig. 5) by the weight of the floor itself and thus the pins are automatically positioned out of the way. However, immediately upon release of the pins by the floor, the pins rise to the positions shown in Figs. 6 and 7.

It is pointed out that the lower free edge 58 of floor part 38 does not contact runs 28 but is held free thereof until the edge 58 comes to rest on the cleat 34 (see Fig. 1).

In order to more fully support the articulated floor and to strengthen and rigidify the same, there are provided a pair of plates 60 and 62. These plates are hinged together at 64 and are cut out at 66 to provide space to receive strips 46. The strips 60 and 62 are in the forms of links and are relatively narrow in a horizontal direction but have considerable depth in a vertical direction and each is provided with a straight upper edge 68 which supports a floor member 36 or 38 as seen in Fig. 1, the ends of the elements 60, 62 being pivoted as at 70 to the respective floor parts.

When the floor starts its motion from the Fig. 1 position to that of Figs. 6 or 7, the elements 60 and 62 relatively retreat from the floor parts and finally become substantially completely folded as clearly shown in Fig. 6; but when the extended condition of Fig. 1 is achieved, the floor parts are firmly supported in a horizontal plane by the elements 60 and 62 acting in the nature of a truss.

A caster 72 may be applied to either floor part or to either element 60 or 62 as shown for additional supporting action at the center of the floor, but this caster is not completely necessary and may be omitted.

The same is true of caster 74 shown upon which the center of the playpen is supported in folded condition (see Fig. 6), and this caster when present supports the entire construction of the floor in its initial motion from the position of Fig. 7 towards extended condition, rendering this action as well as the reverse action much easier and smoother.

A kick plate 76 may be applied to one of the elements 60, 62 and as shown at 78 in Fig. 6. This kick plate may be urged in the direction of the arrow by the operator's foot in order to hasten the unfolding action of the floor as it is being urged outwardly by pins 50, so that the operator may swing out the walls 14 and 16 and manually connect the latches 24, while at the same time nudging the floor links by means of kick plate 76 to quickly extend the floor without any further manual action.

It will be seen that the present invention provides a relatively simple construction which is extremely easy to fold and to unfold and in which the floor is well supported when in use and completely out of the way when folded. The action of the parts is rendered smoother and easier acting, and the construction of the play-yard is made stronger and more rigid without detracting from the simplicity of the construction.

Having thus described my invention and the advantages thereof, I do not wish to be limited to the details herein disclosed, otherwise than as set forth in the claims, but what I claim is:

1. A folding play-yard comprising front and rear walls and interconnecting inswinging side walls, a multipart articulated full floor hinged at one edge to the front wall and being substantially free of the rear wall, means to initially fold the articulated floor to position the same against the front wall, means stopping the folding action of one of the floor parts, said means being positioned on the inswinging side walls and having swinging motion therewith to initially extend the floor upon motion of the swinging side walls outwardly from folded toward extended condition.

2. The play-yard of claim 1 wherein said stopping means comprises an upright retractable pin on each swinging side wall.

3. The play-yard of claim 1 wherein said stopping means comprises a retractable pin on each swinging side wall, and resilient means urging the pins upwardly above the plane of the floor when extended and being depressed by the floor to underlie the same in folded condition thereof.

4. A folding play-yard comprising a front wall, a rear wall, and swinging side walls connecting the front and rear walls, a multi-part articulated complete floor hinged at one edge to one of said front or rear walls and being free of the other wall, a link pivoted adjacent an end of the link to each floor part adjacent the respective outer edge of the respective floor part, said links being pivotally connected together adjacent a line of articulation between a pair of floor parts, and each link having a supporting edge underlying and contacting the under surface of the respective floor parts in extended condition of the latter and supporting the floor in horizontal extended condition, said links folding downwardly at their point of inter-pivotal connection upon folding of the floor parts together.

5. A folding play-yard comprising a front wall, a rear wall, and swinging side walls connecting the front and rear walls, an articulated floor hinged at one edge to one of said front or rear walls and being free of the other wall, a link pivoted to each floor part, said links being pivoted together, and each link having a separate supporting edge underlying and contacting the under surface of a respective floor part in extended condition of the latter and supporting the floor in horizontal extended condition, each link being relatively wide in a direction transverse to the plane of its respective floor part, said links pivoting downwardly, opposite to the pivotal, folding action of the floor parts, upon folding of the latter.

6. A folding play-yard comprising a front wall, a rear wall, and swinging side walls connecting the front and rear walls, a two-part articulated floor hinged at the edge of one part to one of said front or rear walls and the other part being free of the other wall, a link pivoted to each floor part at points remote from the line of articulation thereof, said links being pivoted together adjacent the said line of articulation of the floor parts, and each link having a separate supporting edge underlying and contacting the under surface of the respective floor parts in extended condition of the latter for supporting the same in horizontal extended condition, said links pivoting downwardly, opposite to the pivotal, folding action of the floor parts, upon folding of the latter.

7. A folding play-yard comprising a front wall, a rear wall, and swinging side walls connecting the front and rear walls, an articulated multi-part floor hinged at one edge to one of said front or rear walls and being free of the other wall, a link pivoted to each floor part, said links being pivoted together centrally of the play-yard, and each link having a supporting edge underlying and contacting the under surface of the respective floor parts in extended condition of the latter and supporting the floor in horizontal extended condition, each link being relatively wide in a direction transverse to the plane of its respective floor part and the location of the hinge connection of each link to its floor part being remote from the conjoining edges of the floor parts.

8. A folding play-yard comprising a front wall, a rear wall, and inswinging side walls connecting the front and rear walls, a multi-part articulated floor having one part hinged at one edge thereof to one of said walls, said floor being free of the other wall, a link pivoted to each floor part, said links being pivoted together, and each link having a supporting edge underlying and supporting the under surface of the respective floor parts in extended condition of the latter, the location of the hinge connection of each link to its floor part being remote from the conjoining edges of the floor parts, said links being otherwise free of the floor parts and the location of the pivot connection between the links being spaced down from the floor parts, said floor parts in general rising from extended to folded condition while the links move relatively to the floor parts and the location of the pivot connection of each link to its floor part being remote from the hinged edges of the floor parts at the center of the play-yard.

9. A folding play-yard comprising a front wall, a rear wall, and swinging side walls connecting the front and rear walls, an articulated floor hinged at one edge to one of said front or rear walls and being free of the other wall, a link pivoted to each floor part, said links being pivoted together, and each link having a supporting edge underlying and contacting the under surface of its respective floor part in horizontal extended condition of the latter, and the location of the pivot connection of each link to its floor part being remote from the conjoining edges of the floor parts, said links being otherwise free of the floor parts and the location of the pivot connection between the links being spaced from the floor parts and below the same, said floor parts in general rising at the point of articulation from flat to folded condition while the links move relatively oppositely to the floor parts with the pivot connection between the links extending relatively downwardly.

10. The folding play-yard of claim 9 including a support on one of said links adjacent the pivot point between the links, said support supporting the links, the floor and the play-yard in general centrally thereof in folded condition.

11. The folding play-yard of claim 9 including a support located on and extending generally transversely with respect to one of said links and supporting the same and the floor in extended condition thereof.

12. A folding play-yard comprising a front wall, a rear wall, and swinging side walls connecting the front and rear walls, a multi-part articulated floor hinged at one edge to one of said front or rear walls and being free of the other wall, a link pivoted to each floor part, said links being pivoted together, and each link having a supporting edge underlying and contacting the under surface of its respective floor part in extended condition of the latter and supporting the floor in horizontal extended condition, and means to initiate unfolding motion of the floor parts, said means including a portion of one of the links extending below the walls of the play-yard when folded.

13. A folding play-yard comprising a front wall, a rear wall, and swinging side walls connecting the front and rear walls, a multi-part articulated floor hinged at one edge to one of said front or rear walls and being free of the other wall, a link pivoted to each floor part, said links being pivoted together, and each link having a supporting edge underlying and contacting the under surface of the respective floor parts in extended condition of the latter and supporting the floor in horizontal extended condition, and means to initiate unfolding motion of the floor parts, said last-named means including a kickplate on one of the links and extending below the walls of the play-yard when folded for easy actuation by the foot of the operator.

References Cited in the file of this patent

UNITED STATES PATENTS

| | | |
|---|---|---|
| 134,111 | Thorson | Dec. 17, 1872 |
| 526,081 | Mackie | Sept. 18, 1894 |
| 1,372,117 | Blake | Mar. 22, 1921 |
| 1,516,322 | Beaucoudray | Nov. 18, 1924 |
| 1,528,031 | Smith | Mar. 3, 1925 |
| 1,795,697 | Abela | Mar. 10, 1931 |
| 2,041,509 | O'Byrne | May 19, 1936 |
| 2,173,639 | Swanson | Sept. 19, 1939 |
| 2,681,456 | Schiemer | June 22, 1954 |
| 2,688,756 | Carlson | Sept. 14, 1954 |